US011651329B2

(12) United States Patent
Ellis et al.

(10) Patent No.: US 11,651,329 B2
(45) Date of Patent: May 16, 2023

(54) MACHINE READABLE TECHNOLOGIES FOR THE SMART SHIPPING OF MULTIPLE PRODUCTS

(71) Applicant: MERCARI INC., Palo Alto, CA (US)

(72) Inventors: Brad Ellis, Minato-Ku (JP); Dai Okabayashi, Palo Alto, CA (US); Robin Clark, San Francisco, CA (US); Tadasu Isogawa, Mitaka (JP)

(73) Assignee: MERCARI, INC., Palo Alto, CA (US)

( * ) Notice: Subject to any disclaimer, the term of this patent is extended or adjusted under 35 U.S.C. 154(b) by 0 days.

(21) Appl. No.: 17/504,741

(22) Filed: Oct. 19, 2021

(65) Prior Publication Data

US 2022/0036303 A1 Feb. 3, 2022

Related U.S. Application Data (63) Continuation of application No. 16/573,049, filed on Sep. 17, 2019, now Pat. No. 11,182,735.

(Continued)

(51) Int. Cl.
*G06Q 10/08* (2012.01)
*G06K 7/14* (2006.01)
*G06Q 10/083* (2023.01)

(52) U.S. Cl.
CPC ....... *G06Q 10/0838* (2013.01); *G06K 7/1417* (2013.01)

(58) Field of Classification Search
CPC .......... G06Q 10/0838; G06K 7/1417
See application file for complete search history.

(56) References Cited

U.S. PATENT DOCUMENTS 11,074,634 B2 7/2021 Oh et al.
11,182,735 B2 11/2021 Ellis et al.
(Continued)

FOREIGN PATENT DOCUMENTS

WO WO 2018100570 A1 6/2018

OTHER PUBLICATIONS

European Search Report directed to related European Application No. 19868964.8, dated May 25, 2022; 8 pages.
(Continued)

*Primary Examiner* — Matthew Mikels
(74) *Attorney, Agent, or Firm* — Sterne, Kessler, Goldstein & Fox P.L.L.C.

(57) ABSTRACT

Provided herein are various embodiments of using machine readable technologies for the smart shipping of multiple products. An embodiment operates by receiving a request from a seller to ship a plurality of items that have been sold via an electronic marketplace. Information pertinent to shipping each of the plurality of items is predicted. A shipping company to ship the plurality of items is selected and provided the predicted information. A single machine readable code for shipping the plurality of items using the identified shipping company is determined based at least in part on the predicted information. A confirmation is received from the computing system of the shipping company responsive to the single machine readable code being scanned by a computing device of the computing system of the shipping company, the confirmation indicating that one or more of the plurality of items have been received by shipping company for shipment.

20 Claims, 7 Drawing Sheets

Related U.S. Application Data (60) Provisional application No. 62/769,752, filed on Nov. 20, 2018.

(56) References Cited

U.S. PATENT DOCUMENTS

| | | |
|---|---|---|
| 11,282,100 B2 | 3/2022 | Oh et al. |
| 11,341,550 B2 | 5/2022 | Schubert et al. |
| 2008/0004987 A1 | 1/2008 | Choe et al. |
| 2011/0276385 A1 | 11/2011 | Keller |
| 2012/0166298 A1 | 6/2012 | Smith et al. |
| 2014/0100991 A1 | 4/2014 | Lenahan et al. |
| 2016/0132840 A1 | 5/2016 | Bowles et al. |
| 2017/0103623 A1 | 4/2017 | Sugiyama et al. |
| 2017/0124635 A1 | 5/2017 | Shao |
| 2017/0154347 A1* | 6/2017 | Bateman ............... G06Q 50/28 |
| 2018/0108066 A1 | 4/2018 | Kale et al. |
| 2019/0156253 A1* | 5/2019 | Malyack ............... G06N 5/022 |
| 2020/0104866 A1 | 4/2020 | Lagerling et al. |
| 2020/0104868 A1 | 4/2020 | Schubert et al. |
| 2020/0160266 A1 | 5/2020 | Ellis et al. |

OTHER PUBLICATIONS

International Search Report and Written Opinion directed to related International Application No. PCT/US2019/053393, dated Mar. 5, 2020; 12 pages.

International Preliminary Report on Patentability directed to related International Application No. PCT/US2019/053393, dated Mar. 23, 2021; 9 pages.

* cited by examiner

MACHINE READABLE TECHNOLOGIES FOR THE SMART SHIPPING OF MULTIPLE PRODUCTS

CROSS-REFERENCE TO RELATED APPLICATIONS

This application is a continuation of U.S. patent application Ser. No. 16/573,049 titled "Computer Technologies for Enabling Smart Shipping Using QR Codes", filed on Sep. 17, 2019, which claims priority to U.S. Provisional Patent Application No. 62/769,752 titled "QR Code Based Shipping and Enhancing New Seller Experience," filed on Nov. 20, 2018, both of which are herein incorporated by reference in their entireties.

This application is related to U.S. patent application Ser. No. 16/288,158 titled "Determining Sellability Score and Cancellability Score," filed Feb. 28, 2019; U.S. patent application Ser. No. 16/288,199 titled "Inventory Ingestion, Image Processing, and Market Descriptor Pricing System," filed Feb. 28, 2019; U.S. patent application Ser. No. 16/288,203 titled "Inventory Ingestion and Pricing System," filed Feb. 28, 2019; U.S. patent application Ser. No. 16/288,379 titled "Probabilistic Item Matching and Searching," filed Feb. 28, 2019; and U.S. patent application Ser. No. 16/288,373 titled "Probabilistic Search Biasing and Recommendations," filed Feb. 28, 2019, all of which are herein incorporated by reference in their entireties.

BACKGROUND

Field

This disclosure is generally directed to computer technologies for enabling smart and intelligent shipping of items sold from sellers (sometimes called first users herein) to buyers (sometimes called second users herein).

Background

There are many websites and apps that allow users to sell new or used products. Often, though, shipping from the seller to the buyer can be a challenge. For example, a seller may not have a box that is big enough or strong enough to ship the item that he sold. Or, the seller may not know how to package the item to prevent damage while being shipped. Also, in situations where the website collects shipping fees from the buyer, the website could lose money if the shipping fees were underestimated due to inaccurate information provided by the seller (such as the dimensions, weight, brand, model, description, etc., of the item sold).

SUMMARY

Provided herein are system, apparatus, article of manufacture, method and/or computer program product embodiments, and/or combinations and sub-combinations thereof, for using innovative computer technologies to enable smart shipping of items sold from sellers to buyers.

An embodiment performs operations that include: predicting shipping information for shipping an item associated with a first user to a destination designated by a second user, including determining a category of the item to identify similar items from a historical database; storing at least some of the shipping information in databases of an Internet site; and generating a machine readable code associated with the item or the shipping information, wherein a shipper uses information from scanning the code to access and retrieve the shipping information from the databases of the site using an application programming interface (API) of the site, and wherein the shipper uses the retrieved shipping information to ship the item to the destination.

In an embodiment, predicting the shipping information includes: accessing actual shipping information from past listings in the historical database corresponding to the similar items; and using at least some of the actual shipping information as the predicted shipping information for shipping the item to the destination.

The operations may also include: storing other of the shipping information in databases of the shipper, wherein the shipper uses the code to retrieve such other of the shipping information from the shipper databases, wherein such other shipping information is not available to the first user to thereby enable an anonymous transaction.

In an embodiment, the shipper provides feedback to the site pertaining to actual shipping of the item to the destination, wherein the feedback includes actual weight and dimensions of the item, an actual box size, and whether the item was hazardous. Such feedback may be stored in the historical database in a past listing associated with the item.

In an embodiment, multiple items associated with the first seller may be shipped to multiple second sellers. In this case, the operations include: predicting shipping information for shipping the multiple items to destinations indicated by the second sellers, including grouping items to a same second user, or to second users proximate to each other; storing at least some of the shipping information of the multiple items in the databases of the site; and generating a single machine readable code associated with all of the multiple items, wherein the shipper uses information from scanning the single code to access and retrieve the shipping information of the multiple items from the databases of the site, and wherein the shipper uses the retrieved shipping information of the multiple items to ship the multiple items to the destinations of the second sellers via a local shipping office for at least some of the grouped items.

In another embodiment, the operations may include: receiving notification that the second user wishes to return the item to the first user; accessing actual shipping information for shipping the item to a destination of the first user; storing at least some of the actual shipping information in the databases of the site; and generating a second machine readable code associated with the item or the actual shipping information, wherein the shipper uses information from scanning the second code to access and retrieve the actual shipping information from the databases of the site, and wherein the shipper uses the retrieved actual shipping information to ship the item to the destination of the first user.

Further features and advantages of the embodiments disclosed herein, as well as the structure and operation of various embodiments, are described in details below with reference to the accompanying drawings. It is noted that this disclosure is not limited to the specific embodiments described herein. Such embodiments are presented herein for illustrative purposes only. Additional embodiments will be apparent to a person skilled in the relevant art based on the teachings contained herein.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 2:
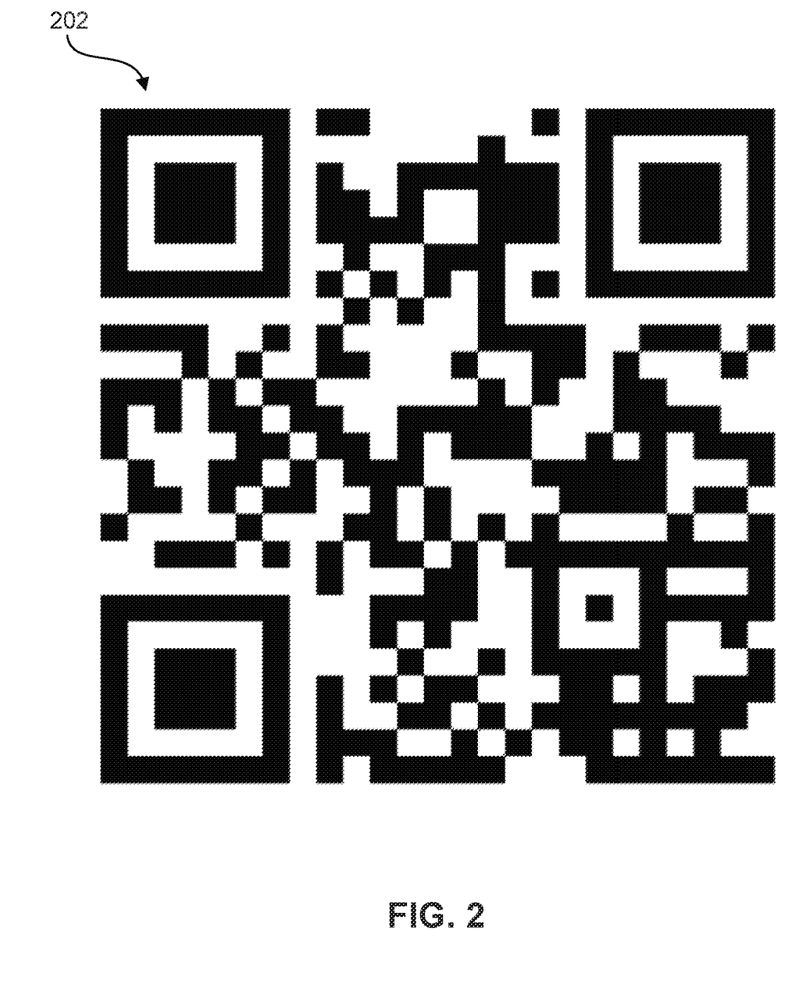
FIG. 2 illustrates an example QR code, according to some embodiments.

Provided herein are system, apparatus, device, method and/or computer program product embodiments, and/or combinations and sub-combinations thereof, for facilitating shipping of products sold via an Internet site using an optical, machine-readable code. In some embodiments, the code may be a bar code or QR (quick response) code, or any other type of optical, machine-readable code. An example QR code 202 is shown in FIG. 2.

Figure 1:
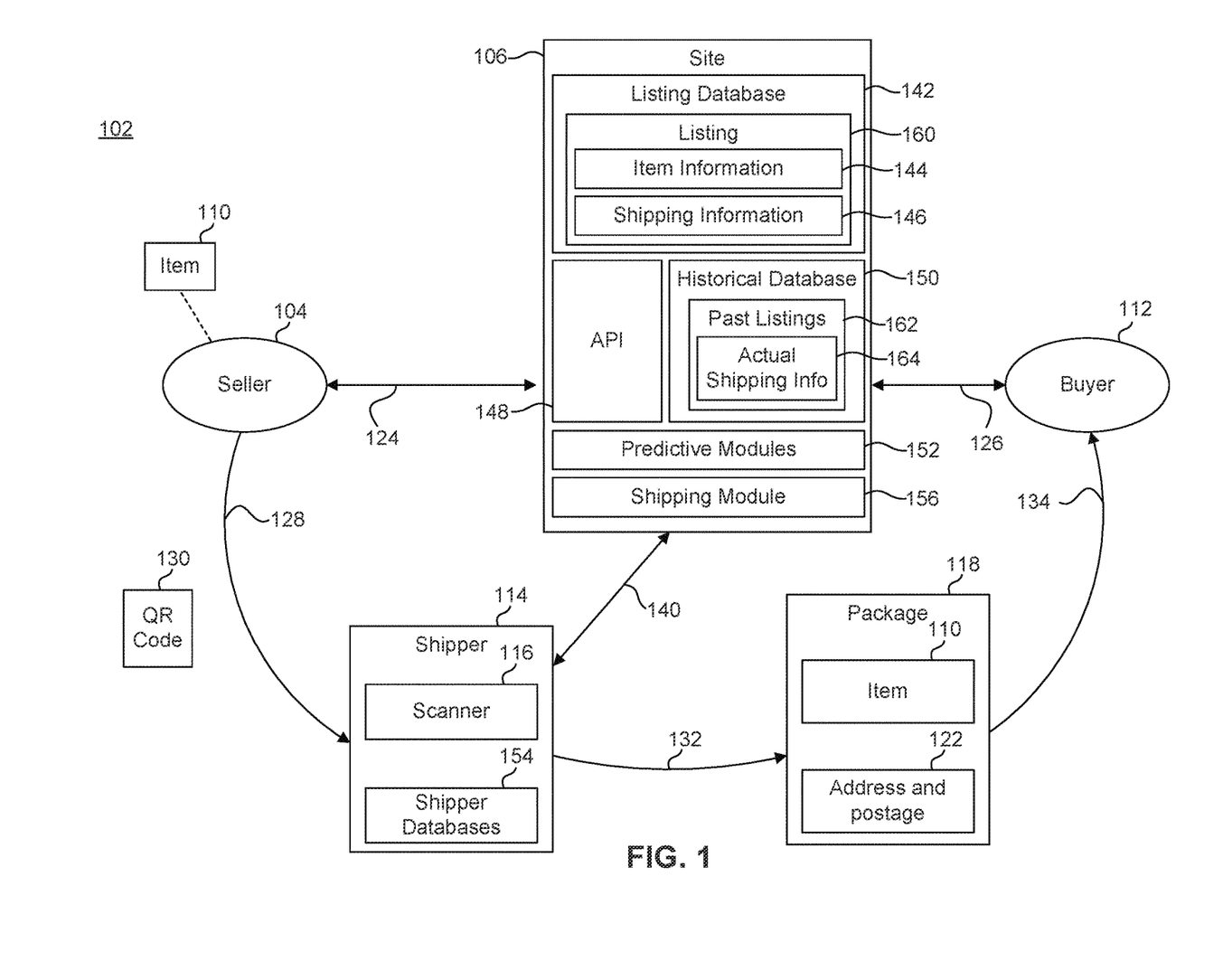
FIG. 1 illustrates an Internet site supported by one or more processing modules, databases, and application programming interfaces (APIs), according to some embodiments.

FIG. 1 illustrates a computing environment 102 that includes an Internet site 106. In some embodiments, site 106 enables sellers 104 to list and sell new or used items 110 to buyers 112. Examples of site 106 include MERCARI.COM, AMAZON.COM, EBAY.COM, CRAIGSLIST.COM, POSHMARK.COM, etc., to name just some examples.

In the example of FIG. 1, a seller 104 has created a listing 160 that is stored in a listing database 142 of site 106, wherein the listing 160 offers an item 110 for sale. The listing 160 may include information 144 about the item 110, such as make, model, brand, year, description, weight, dimensions, etc. Some of this information 144 may not be accurate as to the item 110. For example, the weight and dimensions in the information 144 may not accurately describe the item 110. The accuracy of the information 144 may depend on the knowledge and experience level of the seller 104 as to the item 110 and the creation of listings 160.

The listing 160 may also include information 146 pertinent to shipping the item 110; this shipping information 146 is further discussed below.

The listing database 142 may include any number of listings 160 of items 110 being offered for sale by their respective sellers 104.

Figure 3:
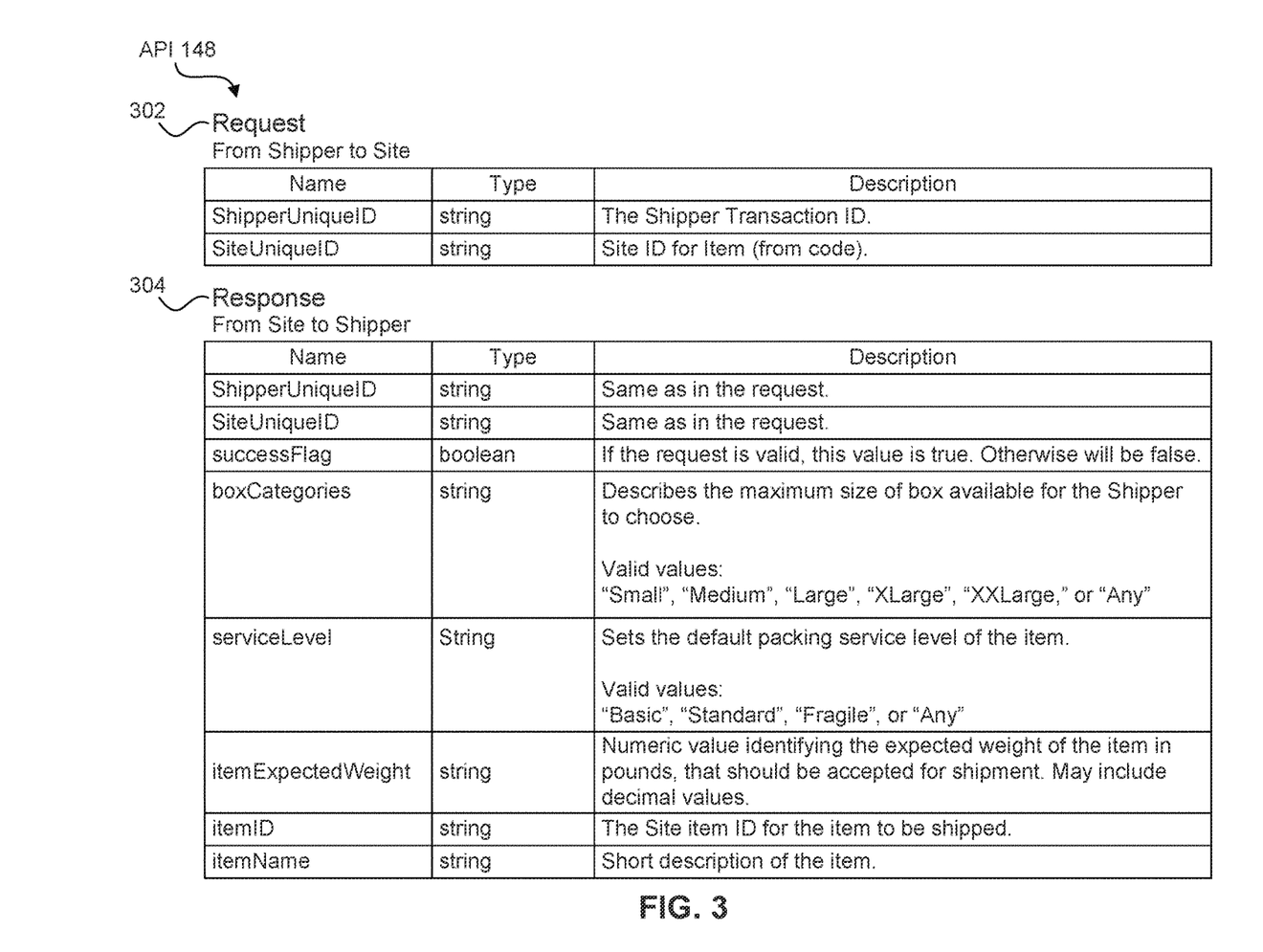
FIG. 3 illustrates an example application programming interface (APIs), according to some embodiments.

The site 106 includes a historical database 150 that includes listings 160 that have sold in the past. The site 106 also includes an application programming interface (API) 148 for enabling other entities (such as but not limited to shipper 114) to access data contained in, for example, listing database 142, and/or other databases of the site 106. An example of API 148 is shown in FIG. 3, which is further described below.

The site 106 includes predictive modules 152 and a shipping module 156 for enabling the smart shipping of items 110 from sellers 104 to buyers 112. The predictive modules 152 and/or shipping module 156 may include artificial intelligence and machine learning technologies for performing their functions. The predictive modules 152 and shipping module 156 are further described below.

Assume a buyer 112 views the listing 160 while browsing the site 106, and decides to purchase the item 110. As will be appreciated, the seller 104 must now ship the item 110 to the buyer 112. But shipping can be a challenge for many people, especially people who do not have printers to print a shipping label, people who do not have shipping materials to pack the item 110 (especially if the item 110 is large or odd sized), and people who are not experienced with calculating and purchasing postage to ship the item 110. These shipping challenges may deter people from listing their items 110 for sale on the site 106. Accordingly, this disclosure provides embodiments for using innovative computer technologies to facilitate the smart and intelligent shipping of items 110 sold via the site 106 using an optical, machine readable code, such as but not limited to a QR code.

Figure 4:
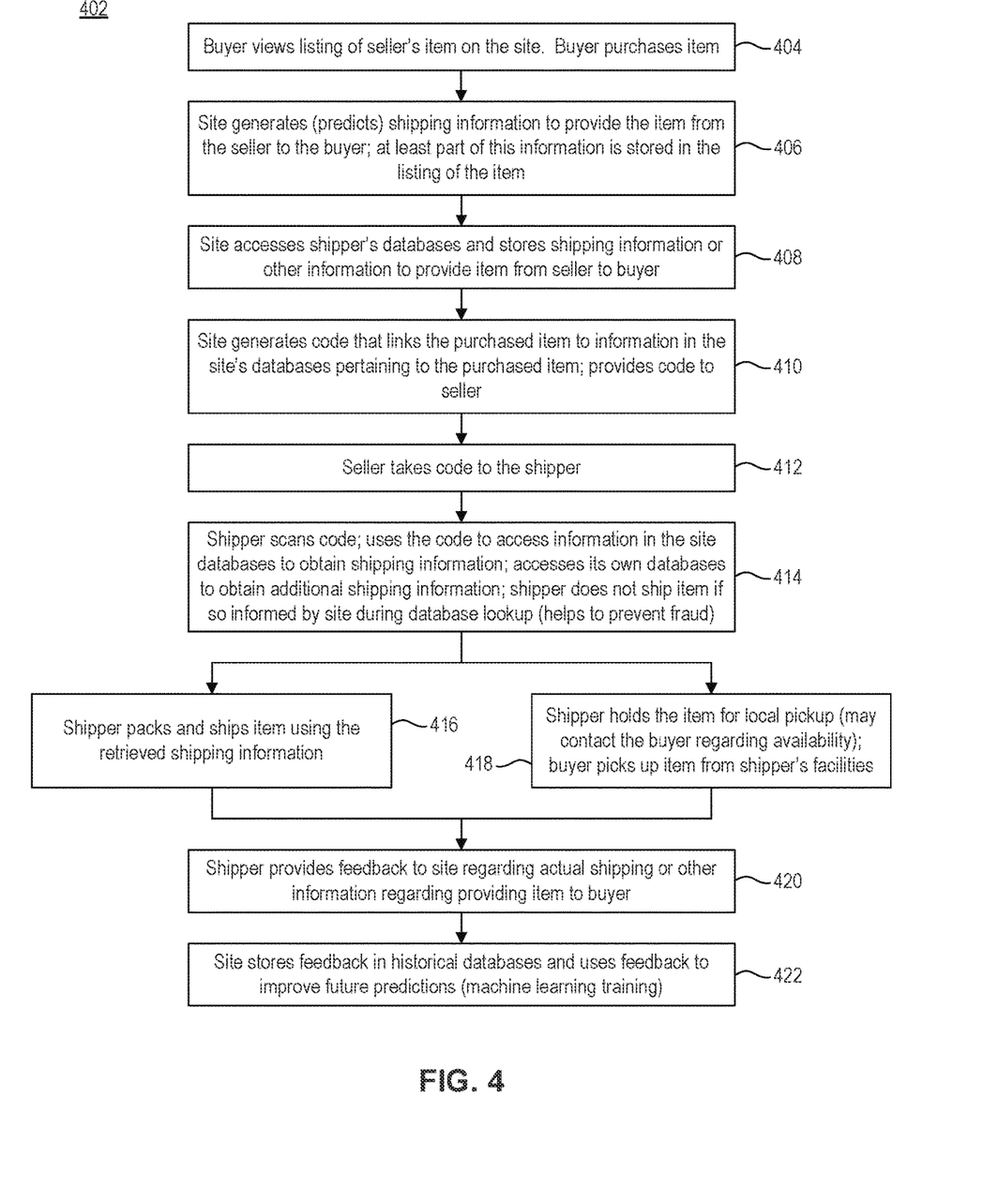
FIG. 4 illustrates a flowchart for using innovative computer technologies to enable smart shipping of items sold from sellers to buyers, according to some embodiments.

FIG. 4 illustrates a flowchart of a method 402 for using innovative computer technologies to enable smart shipping of items sold from sellers to buyers, according to some embodiments. Method 402 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 402 shall be described with reference to FIGS. 1-3. However, method 402 is not limited to those example embodiments.

In 404, as noted above, a given seller 104 creates a listing 160 on the site 106 to sell item 110. The listing 160 is stored in listing database 142, and is available for public viewing to users visiting the site 106.

Also in 404, assume a given buyer 112 views the listing 160 and buys the offered item 110. Thereafter, the buyer 112 pays for the item 110.

In 406, the shipping module 156 in the site 106 generates (that is, predicts) shipping information pertinent to shipping the item 110 to the buyer 112 (that is, to a destination indicated by the buyer 112). Such shipping information may include: (1) contact information of the buyer 112, such as the name, address, phone number, etc., of the buyer 112; (2) information particular to the item 110, such as the size of the item 110, the weight of the item 110, whether the item 110 constitutes liquid or hazardous materials, whether the item 110 is subject to export regulations, etc.; (3) whether the buyer 112 selected local pickup rather than shipping; and/or (4) information particular to the sale of the item 110, such as the delivery date, shipping speed, weekend delivery, signature required, etc., selected by the buyer 112 as part of her purchase of the item 110.

It is noted that some of this information may be included as item information 144 in the listing 160 (such as dimensions and weight of the item 110). But, as noted above, the seller 104 may have incorrectly entered this information when creating the listing 160. Accordingly, in some embodiments, the shipping module 156 does not use this item information 144 for shipping the item 110 to the buyer 112. Rather, in 406, the shipping module 156 uses the predictive module 152 to generate (that is, predict) shipping information pertinent to shipping the item 110 to the buyer 112.

In some embodiments, with regard to the foregoing, the predictive module 152 in the site 106 may use artificial intelligence and machine learning to generate estimates of properties of the item 110 that are pertinent to shipping the item 110, such as the dimensions and weight of the item, whether the item 110 is fragile or constitutes hazardous materials, the size of the box needed to ship the item 110, the strength of the box needed to ship the item 110, the type of shipping materials needed to pack the item 110 in the shipping box, the shipping cost, etc.

The predictive module 152 may generate these estimates by first analyzing the listing 160 to identify the item 110. For example, the predictive module 152 may analyze the listing 160 to determine the category of the item 110 (it is noted that the category of the item 110 may have been determined prior to 406 by the predictive module 152 or other modules in the site 106; in this case, the predictive module 156 may retrieve the category of the item 110 from the listing information 144 in the listing 160). Example categories include smartphone, APPLE MACBOOK, garden tool, men's belt, motorcycle, office desk, woman's purse, comic books, etc. Example embodiments for automatically identifying the category of items 110 is provided in U.S. patent application Ser. No. 16/288,379 titled "Probabilistic Item Matching And Searching," filed Feb. 28, 2019, which is herein incorporated by reference in its entirety, and any of those embodiments may be used herein for automatically determining the category of any given item 110 (whether performed in 406 or prior to 406).

Also in 406, the predictive module 152 may analyze the listing 160 to determine other identifying properties of the item 110, such as the make, model, brand, year of production, etc., of the item 110.

Then, the predictive module 152 may use this information (that is, category, make, model, brand, year of production, etc., of the item 110) to search the historical database 150 to identify and accessed past listings 162 where the same or similar items were sold. In some embodiments, such identified past listings 162 include actual shipping-related information 164 (as opposed to predicted or estimated shipping information), such as the actual dimensions, weight, box size and type, whether liquid or hazardous, etc., of actually shipping the items associated with the past listings 162.

Such actual shipping information 164 from the identified past listings 162 may be pertinent to the shipping of the item 110 to the buyer 112, since the identified past listings 162 relate to items that are the same or similar to the item 110. Accordingly, the shipping module 156 stores the actual shipping information 164 in the shipping information 146 of the listing 160 (or in some other database record in the site 106 that is associated with the item 110 and/or listing 160).

In 408, the shipping module 156 identifies a shipper 114 that was selected by the seller 104, or that is located proximate to the location of the shipper 114, or that has a partnership relationship with the site 106. For example, the shipper 114 could be UPS, FEDERAL EXPRESS, US MAIL, etc. The shipping module 156 then accesses databases 154 of the identified shipper 114, and stores therein information pertinent to the shipping of the item 110 to the buyer 112. Such information may include the name of the buyer 112, the telephone number of the buyer 112, and the address of the buyer 112. In some embodiments, such information of the buyer 112 is not available to the seller 104. Accordingly, embodiments of this disclosure operate to protect such contact information of the buyer 112 from being disclosed to the seller 104, to thereby enable anonymous transactions between sellers 104 and buyers 112.

In 410, the shipping module 156 generates an optical, machine readable code, such as but not limited to a QR code 130 (an example QR code is shown in FIG. 2). The QR code 130 is generated and configured to indicate, designate, include, correlate to, link to, associate with, or otherwise identify the item 110 that was purchased by the buyer 112, the listing 160 associated with the item 110, and/or the shipping information pertaining to the item 110 that was stored in the shipper databases 154 in 408. In some embodiments, the QR code 130 does not include contact information of either the buyer 112 or the seller 104, or other information regarding the item 110 other than specified in the previous sentence, to thereby further enable anonymous transactions between sellers 104 and buyers 112.

In some embodiments, the QR code 130 may be generated by functionality within the shipper 114. In this case, the shipping module 156 may interact with the shipper 114 (via an API provided by the shipper 114) to obtain the QR code 130 from the shipper 114.

Also in 410, the shipping module 156 provides the QR code 130 to the seller 104. For example, the shipping module 156 may include the QR code 130 as part of an email to the seller 104, or the QR code 130 may be accessible to the seller 104 by accessing his account on the site 106. In a similar manner, the shipping module 156 may inform the seller 104 which shipper 114 to use to ship the item 110.

In 412, the seller 104 takes the item 110 to the shipper 114. For example, the shipper 114 could be any UPS store, assuming UPS was identified to the seller 104 in 410.

In 414, the seller 104 provides the QR code 130 to the shipping service 114. This may be done by showing the shipping service 114 a printout of the QR code 130, or by showing the seller 104's phone or tablet (where the email from the site 106 or the seller 104's account on the site 106 is displayed).

The shipping service 114 reads the QR code 130 using a scanner 116 or similar device. As noted above, the QR code 130 indicates, designates, includes, correlates to, links to, associates with, or otherwise identifies the item 110 that was purchased by the buyer 112, the listing 160 associated with the item 110, and/or the shipping information pertaining to the item 110 that was stored in the shipper databases 154 in 408. Accordingly, in 414, the shipping service 114 uses information (called the SiteUniqueID; see FIG. 3) obtained from scanning the QR code 130 to access and retrieve shipping information pertaining to the item 110 from its shipper databases 154. Also in 414, the shipping service 114 uses this information from the QR code 130 to access and retrieve the shipping information 146 from databases in the site 106 (such as from the listing 160 in the listing database 142).

According to some embodiments, the shipping service 114 accesses databases in the site 106 using the site 106's application programming interface (API) 148. FIG. 3 illustrates an example API 148. The API 148 includes a request 302 and a response 304.

Thus, in 414, the shipping service 114 sends a request 302 via the Internet to the site 106 to access and obtain the shipping information 146. The request 302 includes a SiteUniqueID that was obtained from scanning the QR code 130, and that is unique for the item 110, as discussed above. The request 302 also includes a ShipperUniqueID, which is the shipper 114's unique transaction identification (ID) for the item 110.

Further in 414, in response to receiving the request 302 from the shipper 114, the site 106 generates and transmits to the shipper (via the Internet) a response 304. The response 304 includes:

ShipperUniqueID: This is the same from the request 302.

SiteUniqueID: This is the same from the request 302.

successFlag: This is a Boolean flag that indicates whether the request 302 is valid. successFlag may be false if there was an error in scanning the QR code 130, if the purchase of the item 110 by the buyer 112 was cancelled by the buyer 112, or if proper payment of the item 110 was not received, to name just some examples. If successFlag is false, the shipper 114 will not ship the item 110, and method 402 ends. If successFlag is true, method 402 continues with 416 or 418, as discussed below.

boxCategories: This indicates the size of the box that the shipper 114 should use to ship the item 110 to the buyer 112. Example values include small, medium, large, extra large, extra extra large, etc. This shipping information was predicted by the predictive module 152 in 406.

serviceLevel: This indicates the service level for shipping the item 110. Example values include basic, standard, expedited, fragile, hazardous, liquid. This field may include one or more of these values. Some of these values may have been selected by the buyer 112 (such as whether to use basic, standard or expedited shipping). Other values (such as whether fragile or hazardous) may have been predicted by the predictive module 152 in 406.

itemExpectedWeight: This indicates the expected weight of the item 110, as predicted by the predictive module 152 in 406.

itemID: This is the site 106's identification (ID) for the item 110.

itemName: This is a description of the item 110, taken from the item information 144 in the listing 160.

The response 304 may include additional information. For example, the response 304 may indicate whether the buyer 112 has elected local pickup (rather than shipping) in order to save shipping costs.

After 414 is complete, then either 416 or 418 is performed. Specifically, if the response 304 does not indicate local pickup, then 416 is performed. If the response 302 does indicate local pickup, then 418 is performed.

In 416, the shipper 114 packs and ships the item 110 to the buyer 112 according to the information accessed and obtained in 414.

In 418, the shipper 114 stores the item 110 for local pickup by the buyer 112. The shipper 114 may contact the buyer 112 (via email or text, for example, where such contact information of the buyer 112 was obtained in 414) to inform the buyer 112 that the item 110 is available for pickup.

In 420, the shipper 114 provides feedback to the site 106 regarding the actual shipment of the item 110 to the buyer 112 (assuming 416 rather than 418 was performed). Such feedback may include: the actual box size used; the type of box; the actual weight and dimensions of the item 110; whether the item 110 was fragile or hazardous; the actual shipping cost, etc. The shipper 114 may provide such feedback via the API 148, in a message similar in format to the response 304.

In 422, the site 106 stores the listing 160 in the historical database 150, such that the listing 160 becomes a new past listings 162. The site 106 stores the received feedback as actual shipping information 164 in this new past listing 162. In this way, shipping predictions made by the predictive module 152 in 406 improve over time. The site 106 may also bill or credit the seller 104 for deficient or excess shipping costs, respectively, depending on the actual shipping costs provided by the shipper 114 in 420.

Figure 5:
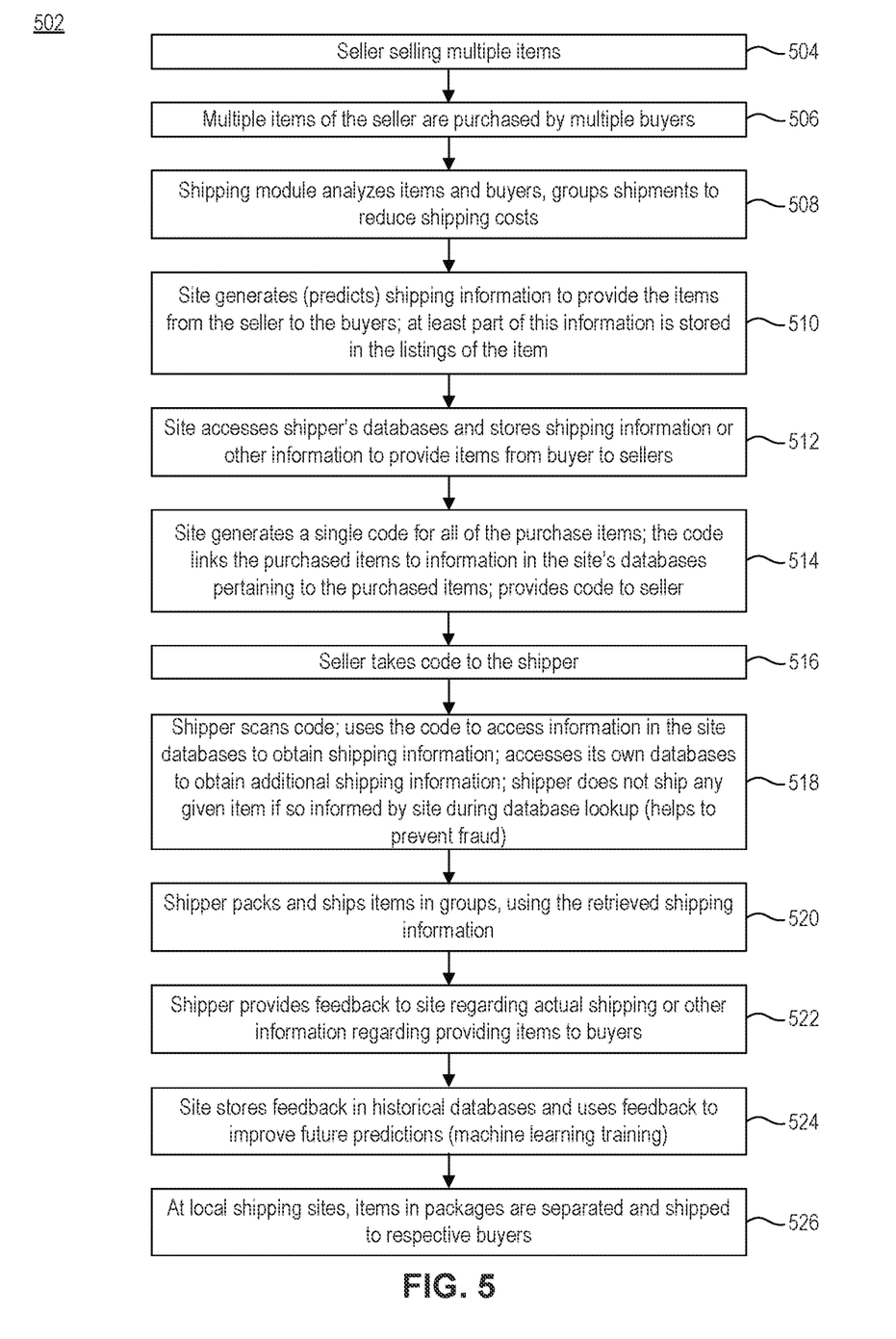
FIG. 5 illustrates a flowchart for using innovative computer technologies to enable smart shipping of items sold from sellers to buyers, wherein a given seller has sold and must now ship multiple items, according to some embodiments.

FIG. 5 illustrates a flowchart of a method 502 for using innovative computer technologies to enable smart shipping of items sold from sellers to buyers, wherein a given seller has sold and must now ship multiple items, according to some embodiments. Method 502 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 502 shall be described with reference to FIGS. 1-3. However, method 502 is not limited to those example embodiments.

As indicated by 504, assume the seller 104 is selling multiple items 110 via multiple listings 160. Also assume, as indicated by 506, that multiple ones of these items 110 are purchased by one or more buyers 112.

Conventionally, each of these sold items 110 are treated as separate transactions, such that the seller 104 is required to manage and keep track of the shipments of the items 110 to buyer(s) 112. But according to some embodiments of this disclosure, the shipping module 156 in the site 106 treats the sold items 110 as a single transaction, and issues to the seller 104 a single QR code 130 that covers shipments of all the sold items 110. Also, the shipping module 156 intelligently ships the items 110 in the least number of boxes possible (even if there are multiple buyers 112) to thereby reduce shipping costs.

Accordingly, in 508, the shipping module 156 analyzes the sold items 110 and the buyers 112, in order to group items 110 together so as to reduce packing and shipping costs. For example, items 110 purchased by the same buyer 112, or buyers 112 who are located closed to each other, are grouped together. As a result of 508, the sold items 110 are separated into one or more groups.

In 510, the shipping module 156 generates (that is, predicts) shipping information pertinent to shipping the items 110 to the buyers 112. Specifically, the predictive module 152 may generate estimates of properties of the item 110 that are pertinent to shipping the items 110. The operation of 510 is similar to the operation of 406 in FIG. 4.

In 512 (similar to 408), the shipping module 156 accesses databases 154 of the shipper 114, and stores therein shipping information pertinent to the shipping of the items 110 to the buyers 112. In the case of a grouping of items 110 that have buyers 112 who are physically close to each other, the shipping information may specify a location proximate to the buyers 112 (such as a local UPS store, in the case where the shipper is UPS). The items 110 in this group would be shipped to this local UPS store, and from there the items can be separated and then individually shipped to the respective buyers 112, or held for local pickup.

In 514 (similar to 410), the shipping module 156 generates a single optical, machine readable code, such as but not limited to QR code 130. The QR code 130 corresponds and applies to all the purchased items (from 506). The shipping module 156 provides the QR code 130 to the seller 104.

In 516 (similar to 412), the seller 104 takes the item 110 to the shipper 114.

In 518 (similar to 414), the seller 104 provides the QR code 130 to the shipping service 114. The shipping service 114 reads the QR code 130 using a scanner 116 or similar device. Then, the shipping service 114 uses information (called the SiteUniqueID; see FIG. 3) obtained from scanning the QR code 130 to access and retrieve shipping information pertaining to the items 110 from its shipper databases 154. Also in 518, the shipping service 114 uses the information from the QR code 130 to access and retrieve the shipping information 146 from databases in the site 106 for the items 110.

As discussed above, the shipping service 114 sends a request 302 via the Internet to the site 106 to access and obtain the shipping information 146 for the items 110.

Further in 518, in response to receiving the request 302 from the shipper 114, the site 106 generates and transmits to the shipper (via the Internet) one or more responses 304. In some embodiments, the site 106 generates a response 304 for each grouping of items 110 (where some groupings may include a single item 110). Or, the site 106 may generate a response 304 for each item 110 irrespective of groupings.

In 520 (similar to 416), the shipper 114 packs and ships the items 110 according to the information retrieved in 518. As noted above, items 110 in the same group may be packed and shipped together to a local shipper office for subsequent pickup or shipping to the respective buyers 112 (this is indicated by 526).

In 522, the shipper 114 sends feedback to the site 106. The operation of 522 is similar to 420.

In 524 (similar to 422), the site 106 stores the listings 160 for the sold items 110 in the historical database 150, such that the listings 160 become new past listings 162. The site 106 stores the received feedback as actual shipping information 164 in these new past listings 162. In this way, shipping predictions made by the predictive module 152 in 510 improve over time.

Figure 6:
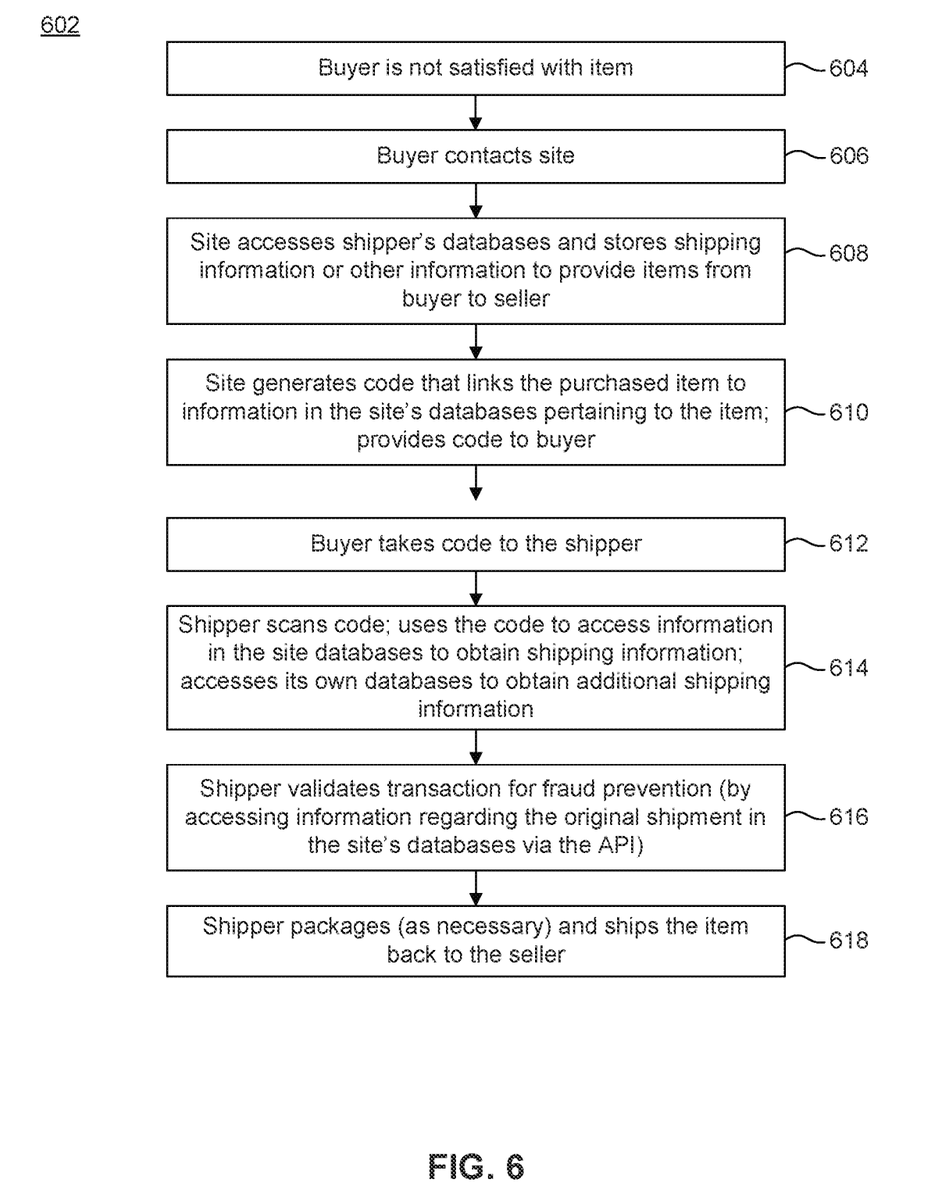
FIG. 6 illustrates a flowchart for using innovative computer technologies to enable smart shipping of items returned from buyers to sellers, according to some embodiments.

FIG. 6 illustrates a flowchart for using innovative computer technologies to enable smart shipping of items returned from buyers to sellers, according to some embodiments. Method 602 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 602 shall be described with reference to FIGS. 1-3. However, method 602 is not limited to those example embodiments.

As indicated by 604, assume the buyer 112 is not satisfied with the item 110 (that was purchased via method 402 or 502, or via some other method). Also assume the buyer 112 contacts the site 106 to return the item 110 to the seller 104 (as indicated by 606).

In 608, the site 106 stores shipping information to ship the item 110 from the buyer 112 to the seller 104 in the shipper databases 154. The operation of 608 is similar to 408 and 512.

In 610, the shipping module 156 generates an optical, machine readable code, such as but not limited to QR code 130. The QR code 130 corresponds and applies to the item 110 that the buyer 112 wishes to return. The shipping module 156 provides the QR code 130 to the buyer 112. The operation of 610 is similar to 410 and 514.

In 612, the buyer 112 takes the item 110 to the shipper 114. The operation of 612 is similar to 412 and 516.

In 614, the buyer 112 provides the QR code 130 to the shipping service 114. The shipping service 114 reads the QR code 130 using a scanner 116 or similar device. Then, the shipping service 114 uses information (called the SiteUniqueID; see FIG. 3) obtained from the QR code 130 to access and retrieve shipping information pertaining to the item 110 from its shipper databases 154. Also in 614, the shipping service 114 uses the information from the QR code 130 to access and retrieve the shipping information 146 from databases in the site 106 for the items 110 (such as from the past listings database 162). The operation of 614 is similar to 414 and 518. But in this case, what is retrieved by the shipper 114 is the actual shipping information 164 pertaining to actual shipment of the item 110, rather than predicted or estimated shipping information 146. Such actual shipping information 164 was provided to the site 106 as feedback in 420 and 522.

In 616, the shipper 114 validates the transaction for fraud prevention by using the information retrieved in 614 from the site 106's databases. For example, the shipper 114 may confirm that the weight of the item being returned matches the weight of the original shipment of the item 110 to the buyer 112. If the weight of the returned item is less than the original weight, then that may indicate that the buyer 112 is not returning the proper item, or is not including all the parts (for example, the buyer 112 may have neglected to include the power cord in the case where the item 110 is a notebook computer). If a discrepancy is detected, the shipper 114 may decline to ship the item 110. In this case, the buyer 112 can try to return the item at a later time (after gathering together the proper item 110 to return), or contact the site 106 to resolve the issue.

In 618 (similar to 416 and 520), assuming no discrepancy was detected in 616, the shipper 114 packs and ships the item 110 according to the information retrieved in 614.

Example Computer System

Figure 7:
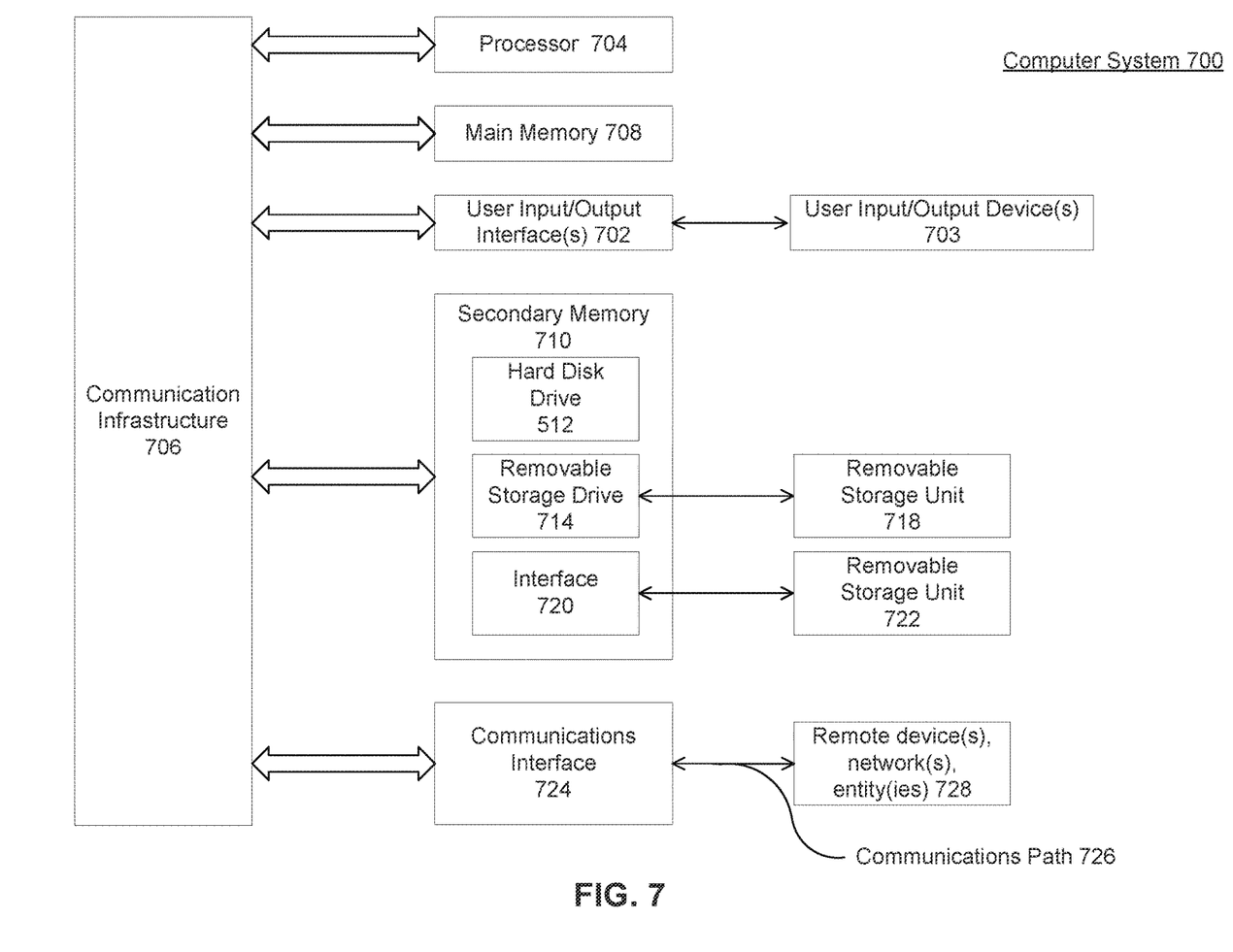
FIG. 7 illustrates an example computer system useful for implementing various embodiments.

Various embodiments and/or components therein can be implemented, for example, using one or more computer systems, such as computer system 700 shown in FIG. 7. Computer system 700 can be any computer or computing device capable of performing the functions described herein. For example, one or more computer systems 700 or portions thereof can be used to implement any embodiments discussed herein, and/or any combination or sub-combination thereof.

Computer system 700 includes one or more processors (also called central processing units, or CPUs), such as a processor 704. Processor 704 is connected to a communication infrastructure or bus 706.

One or more processors 704 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 700 also includes user input/output device(s) 701, such as monitors, keyboards, pointing devices, etc., that communicate with communication infrastructure 706 through user input/output interface(s) 702.

Computer system 700 also includes a main or primary memory 708, such as random access memory (RAM). Main memory 708 can include one or more levels of cache. Main memory 708 has stored therein control logic (i.e., computer software) and/or data.

Computer system 700 can also include one or more secondary storage devices or memory 710. Secondary memory 710 can include, for example, a hard disk drive 712 and/or a removable storage device or drive 714. Removable storage drive 714 can be a floppy disk drive, a magnetic tape drive, a compact disk drive, an optical storage device, tape backup device, and/or any other storage device/drive.

Removable storage drive 714 can interact with a removable storage unit 718. Removable storage unit 718 includes a computer usable or readable storage device having stored thereon computer software (control logic) and/or data. Removable storage unit 718 can be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 can include other means, instrumentalities or other approaches for allowing computer programs and/or other instructions and/or data to be accessed by computer system 700. Such means, instrumentalities or other approaches can include, for example, a removable storage unit 722 and an interface 720. Examples of the removable storage unit 722 and the interface 720 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 can further include a communication or network interface 724. Communication interface 724 enables computer system 700 to communicate and interact with any combination of remote devices, remote networks, remote entities, etc. (individually and collectively referenced by reference number 728). For example, communication interface 724 can allow computer system 700 to communicate with remote devices 728 over communications path 726, which can be wired and/or wireless, and which can include any combination of LANs, WANs, the Internet, etc. Control logic and/or data can be transmitted to and from computer system 700 via communication path 726.

In some embodiments, a non-transitory, tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

What is claimed is:

1. A method comprising:

receiving, by one or more processors of an electronic marketplace, a request from a seller to ship a plurality of items that have been sold via the electronic marketplace;

predicting, by the one or more processors of the electronic marketplace, size and weight information pertinent to shipping each of the plurality of items;

selecting, by the one or more processors of the electronic marketplace, a shipping company to ship the plurality of items;

providing the predicted size and weight information to the selected shipping company;

determining a single machine readable code for shipping the plurality of items using the shipping company based at least in part on the predicted size and weight information, the single machine readable code being compatible with a computing system of the shipping company; and receiving a confirmation from the computing system of the shipping company responsive to the single machine readable code being scanned by a computing device of the computing system of the shipping company, the confirmation indicating that one or more of the plurality of items have been received by the shipping company for shipment.

2. The method of claim 1, wherein the plurality of items were sold across multiple listings on the electronic marketplace.

3. The method of claim 2, wherein the plurality of items were purchased by multiple different buyers.

4. The method of claim 1, wherein the single machine readable code comprises a QR code.

5. The method of claim 4, wherein the QR code does not include contact information of the seller or a buyer.

6. The method of claim 1, further comprising:
providing the shipping company to the seller.

7. The method of claim 1, further comprising:
determining that a buyer selected local pickup rather than shipping for a first item of the plurality of items, wherein the first item is excluded from the predicting.

8. The method of claim 1, wherein the predicting is performed by artificial intelligence or machine learning technologies.

9. A system, comprising:
a memory; and
at least one processor coupled to the memory and configured to perform operations comprising:
receiving a request from a seller to ship a plurality of items that have been sold via an electronic marketplace;
predicting size and weight information pertinent to shipping each of the plurality of items;
selecting a shipping company to ship the plurality of items;
providing the predicted size and weight information to the selected shipping company;
determining a single machine readable code for shipping the plurality of items using the shipping company based at least in part on the predicted size and weight information, the single machine readable code being compatible with a computing system of the shipping company; and
receiving a confirmation from the computing system of the shipping company responsive to the single machine readable code being scanned by a computing device of the computing system of the shipping company, the confirmation indicating that one or more of the plurality of items have been received by the shipping company for shipment.

10. The system of claim 9, wherein the plurality of items were sold across multiple listings on the electronic marketplace.

11. The system of claim 10, wherein the plurality of items were purchased by multiple different buyers.

12. The system of claim 9, wherein the single machine readable code comprises a QR code.

13. The system of claim 12, wherein the QR code does not include contact information of the seller or a buyer.

14. The system of claim 9, the operations further comprising:
providing the shipping company to the seller.

15. The system of claim 9, the operations further comprising:
determining that a buyer selected local pickup rather than shipping for a first item of the plurality of items, wherein the first item is excluded from the predicting.

16. The system of claim 9, wherein the predicting is performed by artificial intelligence or machine learning technologies.

17. A non-transitory computer-readable medium having instructions stored thereon that, when executed by at least one computing device, cause the at least one computing device to perform operations comprising:
receiving a request from a seller to ship a plurality of items that have been sold via an electronic marketplace;
predicting size and weight information pertinent to shipping each of the plurality of items;
selecting a shipping company to ship the plurality of items;
providing the predicted size and weight information to the selected shipping company;
determining a single machine readable code for shipping the plurality of items using the shipping company based at least in part on the predicted size and weight information, the single machine readable code being compatible with a computing system of the shipping company; and
receiving a confirmation from the computing system of the shipping company responsive to the single machine readable code being scanned by a computing device of the computing system of the shipping company, the confirmation indicating that one or more of the plurality of items have been received by the shipping company for shipment.

18. The non-transitory computer-readable medium of claim 17, wherein the plurality of items were sold across multiple listings on the electronic marketplace.

19. The non-transitory computer-readable medium of claim 18, wherein the plurality of items were purchased by multiple different buyers.

20. The method of claim 1, wherein the selecting comprises selecting the shipping company based, at least in part, on one or more shipping options selected by a buyer of at least one of the plurality of items.

* * * * *